Jan. 12, 1965 R. A. PEELER 3,164,853

TELEPHONE DIAL WIPER

Filed Aug. 27, 1962

INVENTOR.

Ruby A. Peeler

United States Patent Office 3,164,853
Patented Jan. 12, 1965

3,164,853
TELEPHONE DIAL WIPER
Ruby Alice Peeler, 2645 Mt. View, San Bernardino, Calif.
Filed Aug. 27, 1962, Ser. No. 219,798
1 Claim. (Cl. 15—244)

This invention relates to cleaning tools and more particularly to a wiper for cleaning telephone dials.

It is an object of the present invention to provide a telephone dial wiper with an upper and lower sponge rubber surface and a pointed tip for insertion between the dial plate and the base of a telephone dial so that the dial may be cleaned quickly with a minimum of effort.

Another object of the present invention is to provide a telephone dial wiper with inwardly beveled side edges that will reach into the smallest crevices of all types of objects.

Other objects of the invention are to provide a telephone dial wiper bearing the above objects in mind which is of simple construction, has a minimum number of parts, is inexpensive to manufacture and efficient in operation.

Figure 1:
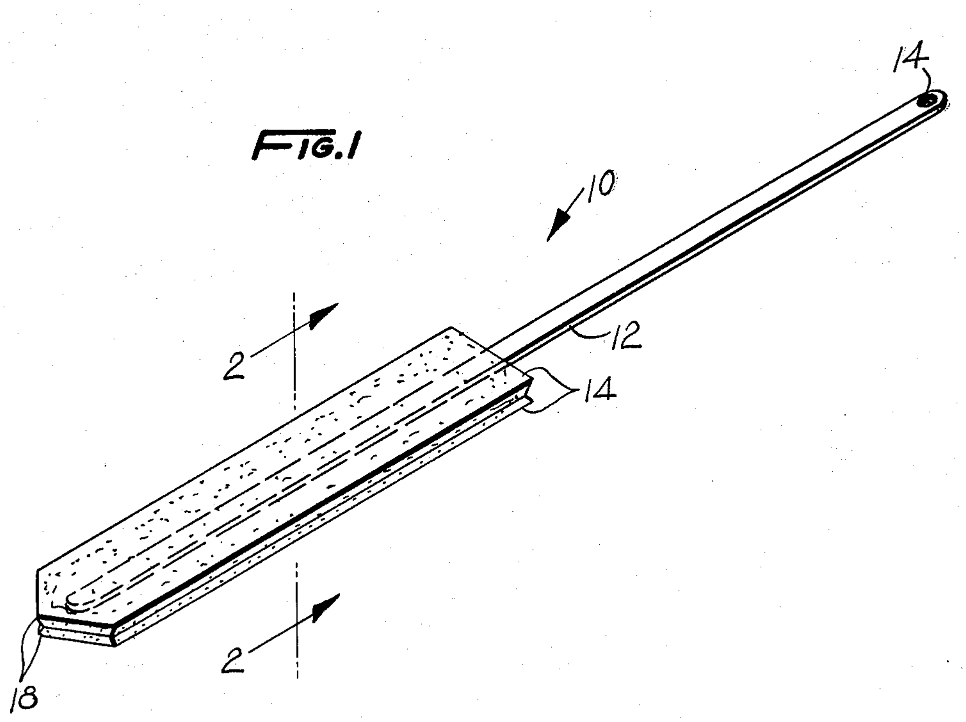
Figure 2:
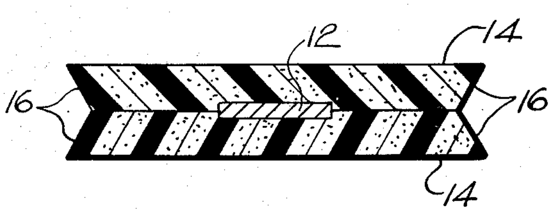

For other objects and for a better understanding of the invention, reference may be had to the following detailed description taken in conjunction with the accompanying drawing, in which:

FIGURE 1 is a perspective view of a telephone dial wiper comprising the present invention; and FIGURE 2 is a view taken on the line of 2—2 of FIGURE 1.

Referring now more in detail to the drawing, a telephone dial wiper 10 made in accordance with the present invention is shown to include an elongated rectangularly configurated handle 12 made of suitable flexible material with a circular opening 14 through one end. Handle 12 is rounded at both ends and a pair of flat elongated sponge rubber strips 14 are secured by cementing and covering the other end of handle 12. Strips 18 are pointed at the forward end of wiper 10 and all sides or edges 16 are beveled inward forming almost feather edges for easy insertion into tiny crevices. The pointed forward end of the sponge rubber strips comprise a pair of individual points, each of which is on the plane of one of the said upper and lower sides.

In operation, handle 12 is grasped in one hand by the operator and the strips 14 of sponge rubber forming a cleaning element are inserted beneath the dial plate in the base of the telephone and in an oscillating and rotating motion will remove any film or dust adhered to the telephone dial.

It will thus be recognized that the strips 14 of sponge rubber material are cemented to the surfaces of handle 12 and to each other and telephone dial wiper may be used for many sorts of cleaning operations where small narrow crevices are present.

While various changes may be made in the detail construction, it shall be understood that such changes shall be within the spirit and scope of the present invention as defined by the appended claim.

What I claim as new and desire to protect by Letters Patent of the United States is:

A telephone dial wiper comprising, in combination, an elongated handle, a pair of opposed sponge rubber strips operatively secured to said handle and covering one end thereof for insertion into a telephone dial for cleaning dust and film from said telephone dial, said sponge rubber strips being elongated and pointed at their forward end, said strips in assembled position having a flat upper side and a flat lower side, said pointed end of said strips of said wiper being inwardly bevelled toward each other and the sides of said strips being bevelled inward toward each other for further ease in cleaning small crevices, and said pointed forward end comprising a pair of individual points, each of which is on the plane of one of the said upper and lower sides.

References Cited in the file of this patent

UNITED STATES PATENTS

| | | |
|---|---|---|
| 1,619,554 | Willson | Mar. 1, 1927 |
| 1,778,270 | Miller | Oct. 14, 1930 |
| 1,822,725 | Cooper | Sept. 8, 1931 |
| 2,290,534 | Cave | July 21, 1942 |
| 2,491,274 | McNeill | Dec. 13, 1949 |
| 2,546,526 | Shirley | Mar. 27, 1951 |
| 2,773,277 | Souter | Dec. 11, 1956 |
| 2,810,150 | Ellman | Oct. 22, 1957 |
| 3,058,139 | Dryden | Oct. 16, 1962 |

FOREIGN PATENTS

| | | |
|---|---|---|
| 443,523 | Great Britain | Mar. 2, 1936 |